United States Patent
Hsu et al.

(10) Patent No.: US 11,454,872 B2
(45) Date of Patent: Sep. 27, 2022

(54) WAVELENGTH CONVERSION ELEMENT AND PROJECTION APPARATUS

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 17/231,004

(22) Filed: Apr. 15, 2021

(65) Prior Publication Data
US 2021/0373423 A1    Dec. 2, 2021

(30) Foreign Application Priority Data
May 29, 2020    (CN) .......................... 202020942412.8

(51) Int. Cl.
*G03B 21/20* (2006.01)

(52) U.S. Cl.
CPC .................. *G03B 21/204* (2013.01)

(58) Field of Classification Search
CPC .............................. G03B 21/204; G03B 33/08
See application file for complete search history.

(56) References Cited

FOREIGN PATENT DOCUMENTS

| CN | 103792635 A |   | 5/2014  |         |
|----|-------------|---|---------|---------|
| CN | 106597787 A | * | 4/2017  |         |
| CN | 207851495 U | * | 9/2018  | ............... F21K 9/64 |
| CN | 209525553 U | * | 10/2019 |         |
| TW | 201610550 A |   | 3/2016  |         |

* cited by examiner

*Primary Examiner* — Rajarshi Chakraborty
*Assistant Examiner* — Glenn D Zimmerman

(57) ABSTRACT

A wavelength conversion element includes a substrate and a wavelength conversion layer. The substrate has a bearing surface and a first positioning portion, and the first positioning portion is located on the bearing surface. The wavelength conversion layer is disposed on the bearing surface and has a second positioning portion corresponding to the first positioning portion, and the second positioning portion is adapted to engage with the first positioning portion. A projection apparatus having the wavelength conversion element is also provided. The disclosure is able to improve assemble accuracy and light conversion efficiency of the wavelength conversion element.

16 Claims, 7 Drawing Sheets

US 11,454,872 B2

WAVELENGTH CONVERSION ELEMENT AND PROJECTION APPARATUS

CROSS-REFERENCE TO RELATED APPLICATION

This application claims the priority benefit of CN202020942412.8, filed on May 29, 2020. The entirety of the above-mentioned patent application is hereby incorporated by reference herein and made a part of this specification.

FIELD OF THE INVENTION

The invention relates to a wavelength conversion element, and more particularly to a wavelength conversion element adapted to a projection apparatus, and a projection apparatus having the wavelength conversion element.

BACKGROUND OF THE INVENTION

As requirement of the quality of the light source of the projection apparatus is increased, the light source is developed from the ultra-high-performance lamp (UHP lamp) and the light emitting diode (LED) into the laser diode (LD) with the requirement such as brightness, color saturation, service life, non-toxic and environmental friendly etc.

Since the cost of the present high-brightness red laser diode and the present high-brightness green laser diode is too high, the blue laser diode is usually used as the light source of the projection apparatus so as to reduce the cost. The wavelength conversion element is generally disposed on a transmission path of an excitation beam provided by the light source in order to convert the excitation beam (such as the blue excitation beam) into the beam with other colors (such as yellow and green) which are required to form a projection image.

The wavelength conversion element includes a substrate and a plurality of wavelength conversion layers, and each wavelength conversion layer has a corresponding preset position on the substrate. In the process of assembling the wavelength conversion element, each wavelength conversion layer must be disposed accurately at the preset position to make the wavelength conversion element provide a preferable wavelength conversion efficiency of the excitation beam. However, in the prior art, the wavelength conversion layers can not be disposed accurately at the preset position during the process of assembling the wavelength conversion element, and it causes the reduced wavelength conversion efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to improve the assemble accuracy and the light conversion efficiency, reduce vibration and noise of the wavelength conversion element, and also reduce the complexity of the structure and the cost of the wavelength conversion element.

The invention provides a projection apparatus to have the advantage of improved image quality.

Other objectives and advantages of the invention can be further understood from the technical features disclosed in the invention.

In order to achieve one or a portion of or all of the objectives or other objectives, an embodiment of the invention provides a wavelength conversion element including a substrate and a wavelength conversion layer. The substrate has a bearing surface and a first positioning portion. The first positioning portion is located on the bearing surface. The wavelength conversion layer is disposed on the bearing surface and has a second positioning portion corresponding to the first positioning portion. The second positioning portion is adapted to engage with the first positioning portion.

In order to achieve one or a portion of or all of the objectives or other objectives, an embodiment of the invention provides a projection apparatus including an illumination system, a light valve and a projection lens. The illumination system is adapted to provide an illumination beam. The light valve is disposed on a transmission path of the illumination beam to convert the illumination beam into an image beam. The projection lens is disposed on a transmission path of the image beam. The aforementioned illumination system includes an excitation light source and the aforementioned wavelength conversion element.

In the wavelength conversion element in an embodiment of the invention, since the substrate has the first positioning portion and the wavelength conversion layer has the second positioning portion, the wavelength conversion layer can be accurately disposed at the preset position of the substrate by the first positioning portion and the second positioning portion engaged with each other during the assembly process. As a result, the wavelength conversion element in an embodiment of the invention can have improved light conversion efficiency. Since the projection apparatus in an embodiment of the invention uses the aforementioned wavelength conversion element, the projection apparatus has the advantage of improved image quality accordingly.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1A:
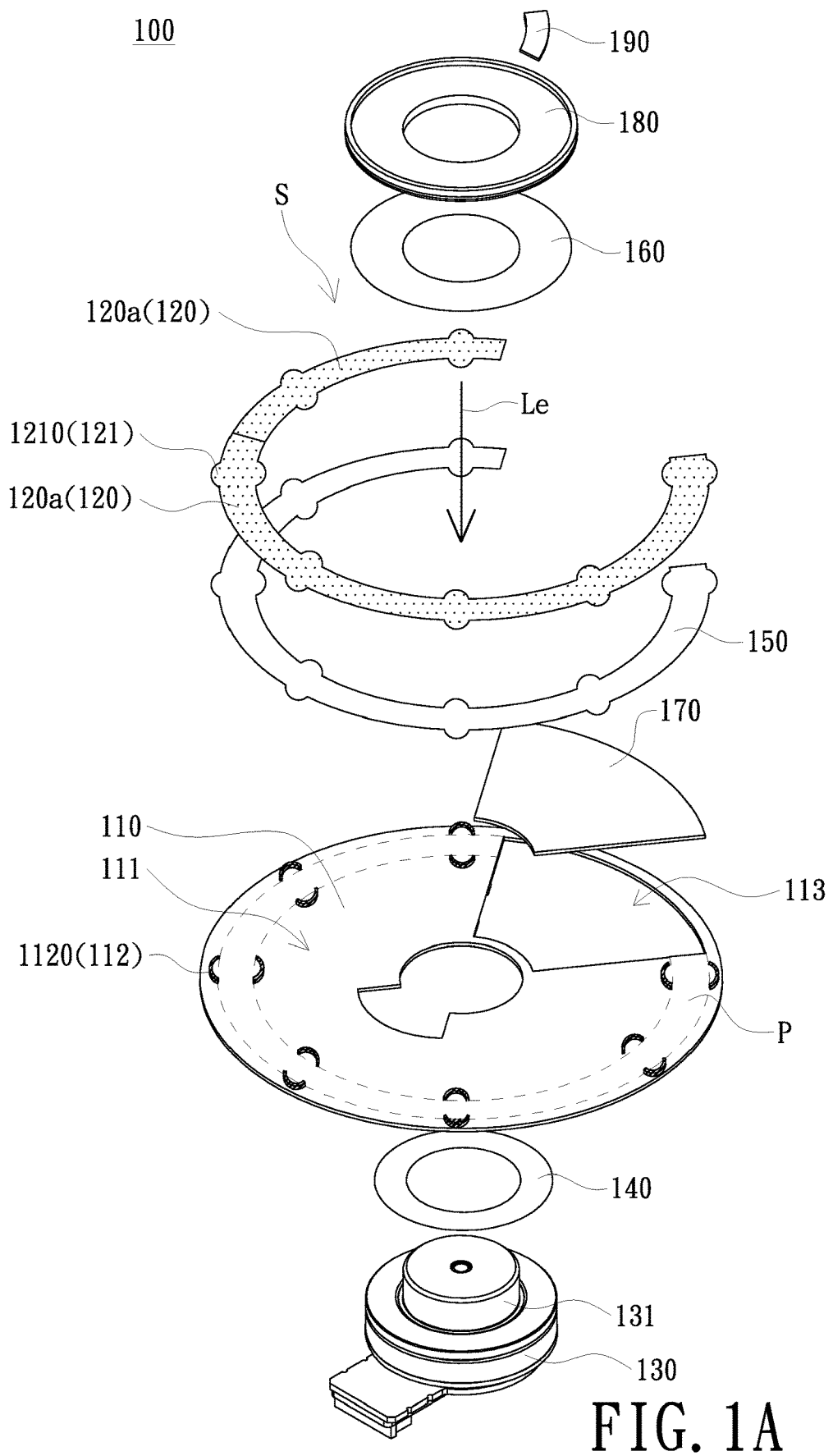
FIG. 1A is a schematic exploded diagram of a wavelength conversion element in an embodiment of the invention.
Figure 1B:
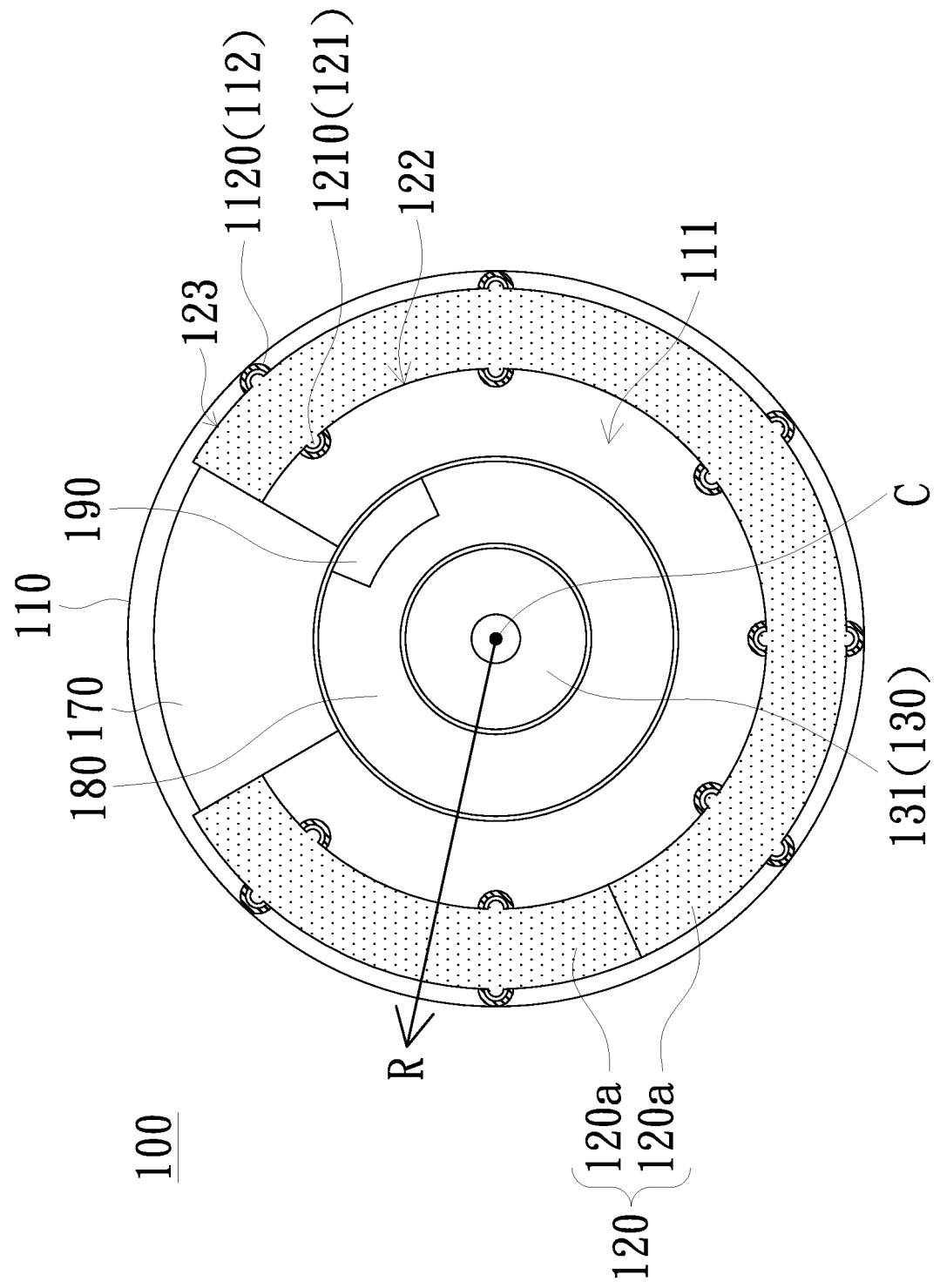
FIG. 1B is a schematic diagram of the wavelength conversion element in an embodiment of the invention.

FIG. 1A is a schematic exploded diagram of a wavelength conversion element in an embodiment of the invention. FIG. 1B is a schematic diagram of the wavelength conversion element in an embodiment of the invention. Please refer to FIGS. 1A and 1B, the wavelength conversion element 100 includes a substrate 110 and a wavelength conversion layer 120. The substrate 110 has a bearing surface 111 and a first positioning portion 112, and the first positioning portion 112 is located on the bearing surface 111. The wavelength conversion layer 120 is disposed on the bearing surface 111 and has a second positioning portion 121 corresponding to the first positioning portion 112. The second positioning portion 121 is adapted to engage with the first positioning portion 112. The wavelength conversion element 100 of this embodiment has a light incident side S adapted to receive an excitation beam Le.

The material of the substrate 110 may be metal, such as aluminum, copper or silver, and has the function of heat dissipation, but the invention is not limited thereto. The bearing surface 111 of the substrate 110 has a preset position P at which the wavelength conversion layer 120 is allowed to be disposed. The first positioning portion 112 is a positioning structure on the substrate 110 and is adjacent to or located at the preset position P where the wavelength conversion layer 120 is disposed on the bearing surface 111. In this embodiment, the substrate 110 having the first positioning portion 112 may be formed by the processing of the machine tool of computer numerical control (CNC), or may be formed by the processing of metal stamping, but the invention is not limited thereto.

The wavelength conversion layer 120 may include a plurality of wavelength conversion sections 120a. A beam with a wavelength different from the excitation beam Le is emitted by the wavelength conversion sections 120a after the excitation beam Le is received by the wavelength conversion sections 120a. The wavelength conversion sections 120a include the materials with different emission wavelengths, for example, fluorescent materials, phosphorescent materials such as phosphor etc., or nanomaterials such as quantum dots etc. For example, the wavelength conversion sections 120a may be respectively formed by yellow phosphor and green phosphor, but the invention is not limited thereto. Although FIGS. 1A and 1B take two wavelength conversion sections 120a as an example, the quantity of the wavelength conversion sections 120a may be one or more than two. Additionally, the second positioning portion 121 is a positioning structure on the wavelength conversion layer 120 and can be engaged with the first positioning portion 112. Specifically, the wavelength conversion sections 120a each have a part of the second positioning portion 121. The wavelength conversion layer 120 having the second positioning portion 121 is formed by, for example, laser cutting; alternatively, the wavelength conversion layer 120 may be coated to have a shape in which the wavelength conversion layer 120 has the second positioning portion 121 during the process of coating the glue materials of the wavelength conversion layer in the mould, and then the wavelength conversion layer 120 is processed by a curing step to have the second positioning portion 121; but the invention is not limited thereto.

In this embodiment, the wavelength conversion layer 120 has an inner edge 122 close to a center C of the substrate 110 and an outer edge 123 away from the center C of the substrate 110 in a radial direction R of the substrate 110. The second positioning portion 121 includes, for example, a plurality of second positioning structures 1210 disposed at the inner edge 122 and the outer edge 123. Each of the wavelength conversion sections 120a has, for example, a plurality of second positioning structures 1210. The first positioning structure 1120 is adapted to engage with the respective second positioning structure 1210. Specifically, please refer to FIGS. 1A and 1B, the second positioning structures 1210 are protruded portions protruded from the inner edge 122 and the outer edge 123. The first positioning structures 1120 are protruded from the bearing surface 111, and the shape of the first positioning structure 1120 and the shape of the second positioning structure 1210 can be engaged with each other. For example, the second positioning structure 1210 is, for example, a semicircular protruded portion, and the first positioning structure 1120 is, for example, a curved sidewall with a shape matched to the semicircular protruded portion. Moreover, the shape of the second positioning structure 1210 may also be a square, triangle, or oval protruded from the inner edge 122 and the outer edge 123, and the shape of the first positioning structure 1120 is corresponding and matched with the shape of the second positioning structure 1210. It is worth mentioning that a thickness of the first positioning portion 112 (measured from the bearing surface 111) is substantially equaled to a thickness of the wavelength conversion layer 120 in a direction perpendicular to the bearing surface 111.

Compared with the prior art, the wavelength conversion element 100 in this embodiment uses the substrate 110 having the first positioning portion 112 and the wavelength conversion layer 120 having the second positioning portion 121, and the first positioning portion 112 and the second positioning portion 121 can be engaged with each other. As a result, the wavelength conversion layer 120 can be disposed preciously and firmly at the preset position P of the bearing surface 111 in the process of assembling, thereby improving the wavelength conversion efficiency and the assembling quality of the wavelength conversion element 100.

Please refer to FIG. 1A. In this embodiment, the wavelength conversion element 100 is, for example, a wavelength conversion wheel and may further include a motor 130, glue layers 140, 150 and 160, a plate body 170, a fixing ring 180 and a counterweight member 190.

The motor 130 has a shaft 131, and the substrate 110 is adhered on the motor 130 by the glue layer 140. The fixing ring 180 is sleeved on the shaft 131 and is adhered on the bearing surface 111 of the substrate 110 by the glue layer 160, so that the substrate 110 can be fixed between the fixing ring 180 and the motor 130. In other word, the substrate 110 is clamped by the fixing ring 180 and the motor 130. The fixing ring 180 may be provided with a counterweight member 190. The counterweight member 190 is, for example, made by metal or plastic, but the invention is not limited thereto. Specifically, the counterweight member 190 can improve the initial amount of unbalance of the wavelength conversion element 100, so that the wavelength conversion element 100 can be rotated stably at high speed.

The wavelength conversion layer 120 is adhered on the bearing surface 111 of the substrate 110 by the glue layer 150, wherein the glue layer 150 is, for example, a thermal conductive glue, but the invention is not limited thereto. Particularly, when the glue layer 150 is a transparent thermal conductive glue, a reflection layer (not shown) may be further disposed between the glue layer 150 and the wavelength conversion layer 120. The shape of the reflection layer is, for example, the same as the shape of the glue layer 150, but the invention is not limited thereto.

In this embodiment, the substrate 110 may have an optical zone 113 adapted to allow the plate body 170 to be disposed thereon. Specifically, the plate body 170 may be a light transmission plate, such as a glass substrate, to allow the excitation beam Le to pass therethrough. Furthermore, the light transmission plate may be provided with a light diffusion layer or a light diffusion microstructure to eliminate the laser speckle formed by the excitation beam Le. The shape of the plate body 170 may be corresponding to the shape of the optical zone 113, for example, the plate body 170 may be embedded in the optical zone 113; however, the invention is not limited thereto. Since the optical zone 113 itself is an opening structure, the optical zone 113 can be used as a light transmission zone to allow the excitation beam Le to directly pass therethrough without disposing the plate body 170 or other optical elements. In an embodiment, the plate body 170 may also be a reflection plate, and the aforementioned optical zone 113 may not be set as the opening structure.

Figure 2:
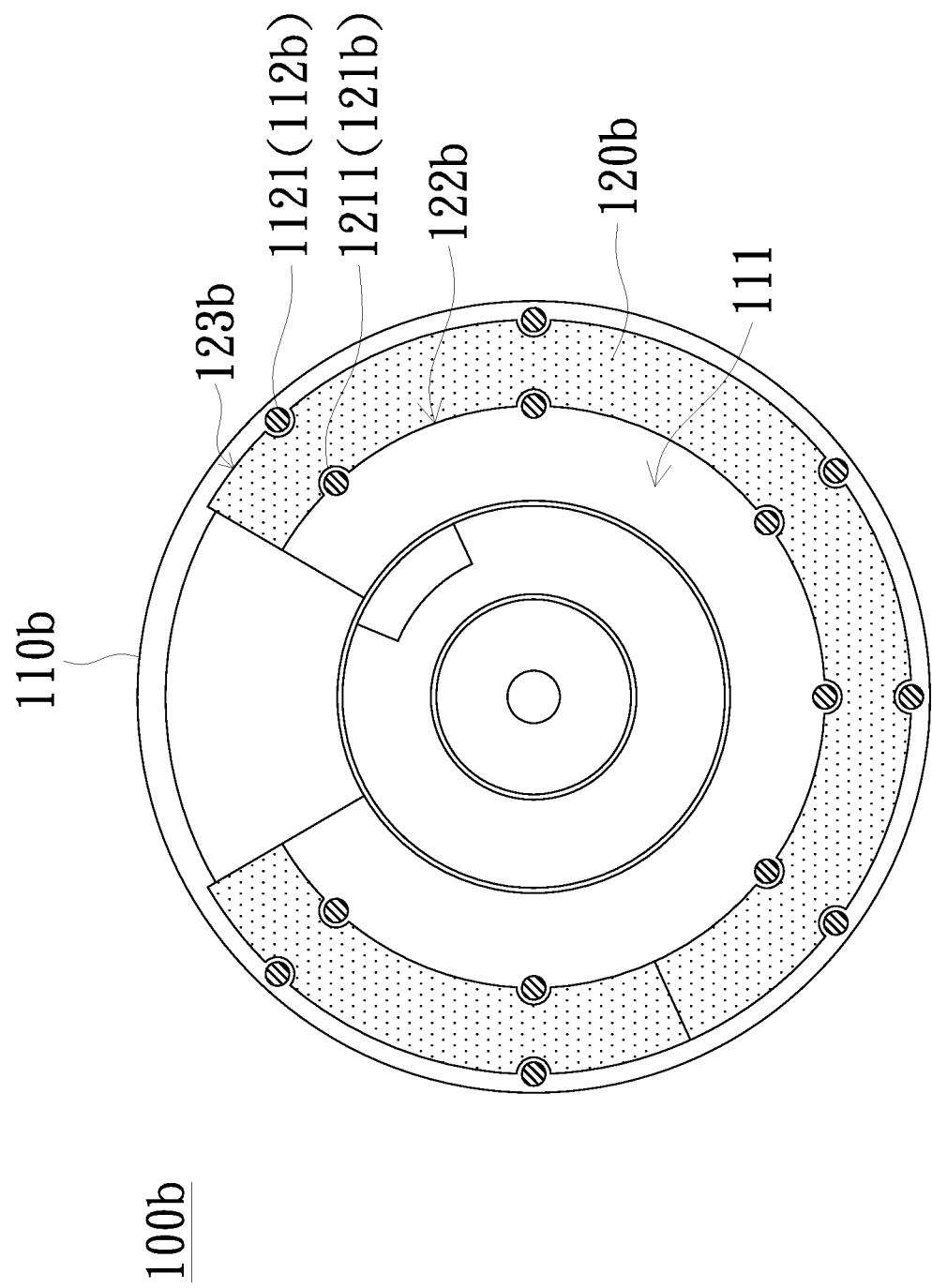
FIG. 2 is a schematic diagram of a wavelength conversion element in another embodiment of the invention.

FIG. 2 is a schematic diagram of a wavelength conversion element in another embodiment of the invention. Please refer to FIG. 2, the structure and the advantage of the wavelength conversion element 100b in this embodiment are similar to those of the aforementioned wavelength conversion element 100, and only the difference will be described in the following. In this embodiment, the second positioning structures 1211 of the wavelength conversion layer 120b are a plurality of recessed portions recessed inward from the inner edge 122b and the outer edge 123b. The first positioning structures 1121 are protruded from the bearing surface 111 of the substrate 110b, and the first positioning structures 1121 and the recessed portions are respectively engaged with each other. For example, the recessed portion is a semicircular recessed portion, and the first positioning structure 1121 is a semicircular convex portion capable of matching with the semicircular protruded portion to form a cylindrical structure. Moreover, the shape of the first positioning structure 1121 may also be a square, triangle or oval recessed inward from the inner edge 122b and the outer edge 123b, and the shape of the second positioning structure 1211 is matched with the first positioning structure 1121.

In another embodiment, the first positioning portions 112 and 112b in the aforementioned embodiments include a plurality of protrusion structures adjacent to the inner edges 122 and 122b and the outer edges 123 and 123b, wherein the aforementioned structure may be an S-shaped convex-concave structure. The second positioning portions 121 and 121b in the aforementioned embodiments may include S-shaped concave-convex structures located at the inner edges 122 and 122b and the outer edges 123 and 123b. The S-shaped convex-concave structure and the S-shaped concave-convex structure respectively have the shapes matching with each other, so that the first positioning portion 112 and the second positioning portion 121 (or the first positioning portion 112b and the second positioning portion 121b) can be engaged with each other.

Figure 3:
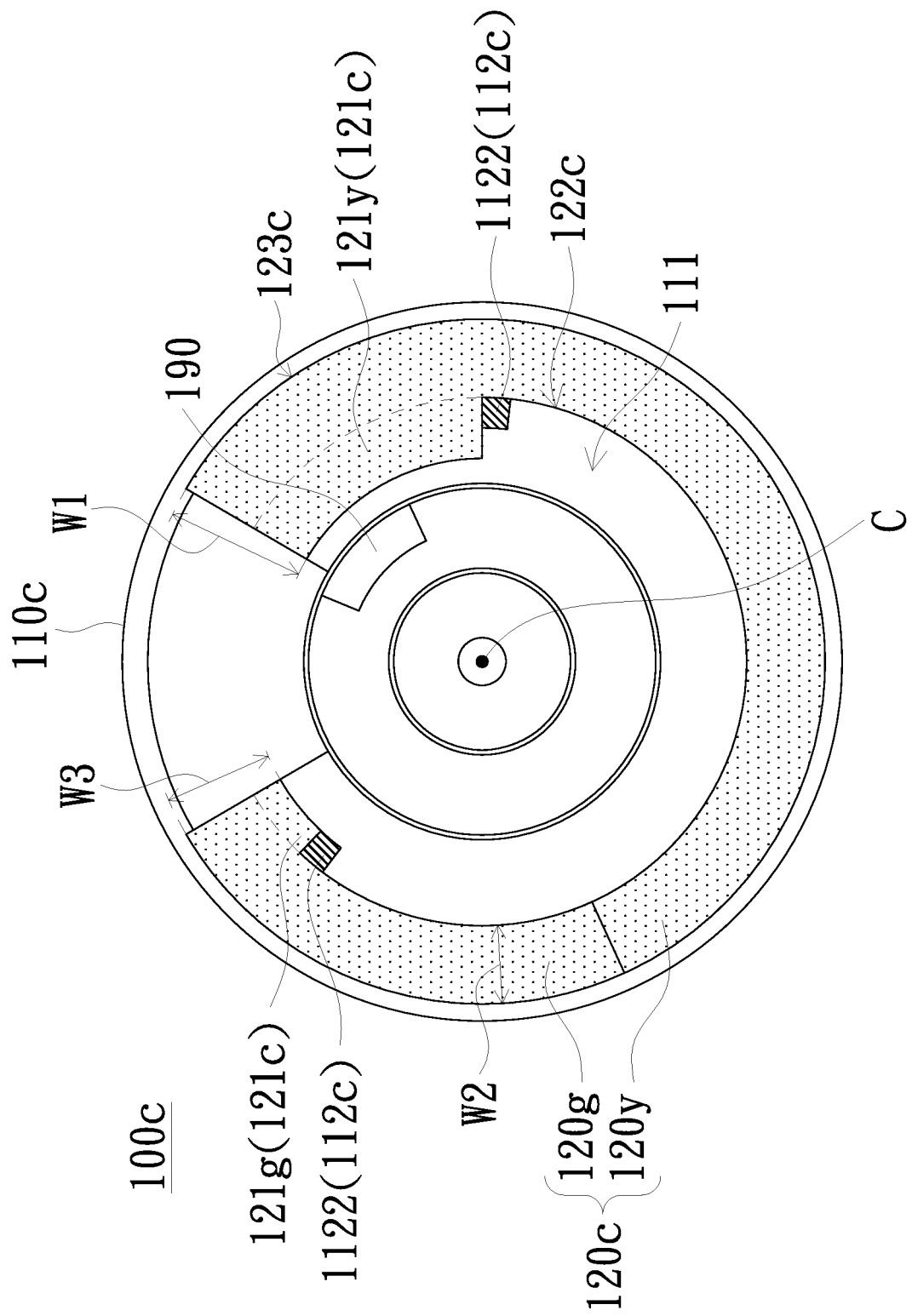
FIG. 3 is a schematic diagram of a wavelength conversion element in another embodiment of the invention.

FIG. 3 is a schematic diagram of a wavelength conversion element in another embodiment of the invention. Please refer to FIG. 3 first, the structure and the advantage of the wavelength conversion element 100c are similar to those of the aforementioned wavelength conversion element 100, and only the difference will be described in the following. The wavelength conversion layer 120c includes two wavelength conversion sections 120g and 120y with the light-emitting wavelengths different from each other, but the features of the wavelength conversion element 100c are not limited by the quantity of the wavelength conversion sections. In this embodiment, the wavelength conversion layer 120c has a plurality of radial widths. Taking FIG. 3 as an example, the wavelength conversion layer 120c has three radial widths W1, W2 and W3, wherein W1>W3>W2, but the invention is not limited thereto. On the other hand, the radial width of the wavelength conversion layer 120c may be increased or decreased along a specific direction. For example, the radial widths of the wavelength conversion sections 120g and 120y may be the smallest at the junction and gradually increase toward a side away from of aforementioned junction, but the invention is not limited thereto.

In the embodiment shown in FIG. 3, the second positioning portions 121c include the inner edge 122c and the outer edge 123c, the second positioning portions 121c respectively are the counterweight portions 121g and 121y of the wavelength conversion sections 120g and 120y extending from the inner edge 122c to the center C of the substrate 110c. The first positioning structures 1122 of the first positioning portion 112c are protruded from the bearing surface 111, and the first positioning structures 1122 and the counterweight portions 121g and 121y are respectively engaged with each other. Particularly, bending structures are formed at the connection between the counterweight portions 121g and 121y and the inner edge 122c, and the first positioning structure 1122 is, for example, a corner post structures having a shape matched with the shape of the bending structure, but the invention is not limited thereto.

It is worth mentioning that in addition to have the function of positioning, the counterweight portions 121g and 121y may have another function of adjusting the initial amount of unbalance of the wavelength conversion element 100c. Particularly, the counterweight portions 121g and 121y may be disposed corresponding to the counterweight member 190 to adjust the initial amount of unbalance of the wavelength conversion element 100c. Moreover, the initial amount of unbalance of the wavelength conversion element 100c may be reduced by the counterweight portions 121g and 121y without disposing the counterweight member 190. In an embodiment, the initial amount of unbalance is about 317 mg when the wavelength conversion sections 120g and 120y are not provided with the counterweight portions 121g and 121y (that is, both the radial widths of the wavelength conversion sections 120g and 120y are W1). The initial amount of unbalance of the wavelength conversion element 100c is about 238 mg after the wavelength conversion sections 120g and 120y are respectively provided with the counterweight portions 121g and 121y, that is, the initial amount of unbalance is reduced by 79 mg.

On the other hand, the aforementioned problem of initial amount of unbalance may also be improved by changing the thickness and/or the density of the wavelength conversion layer. Please refer the description below for details.

Figure 4:
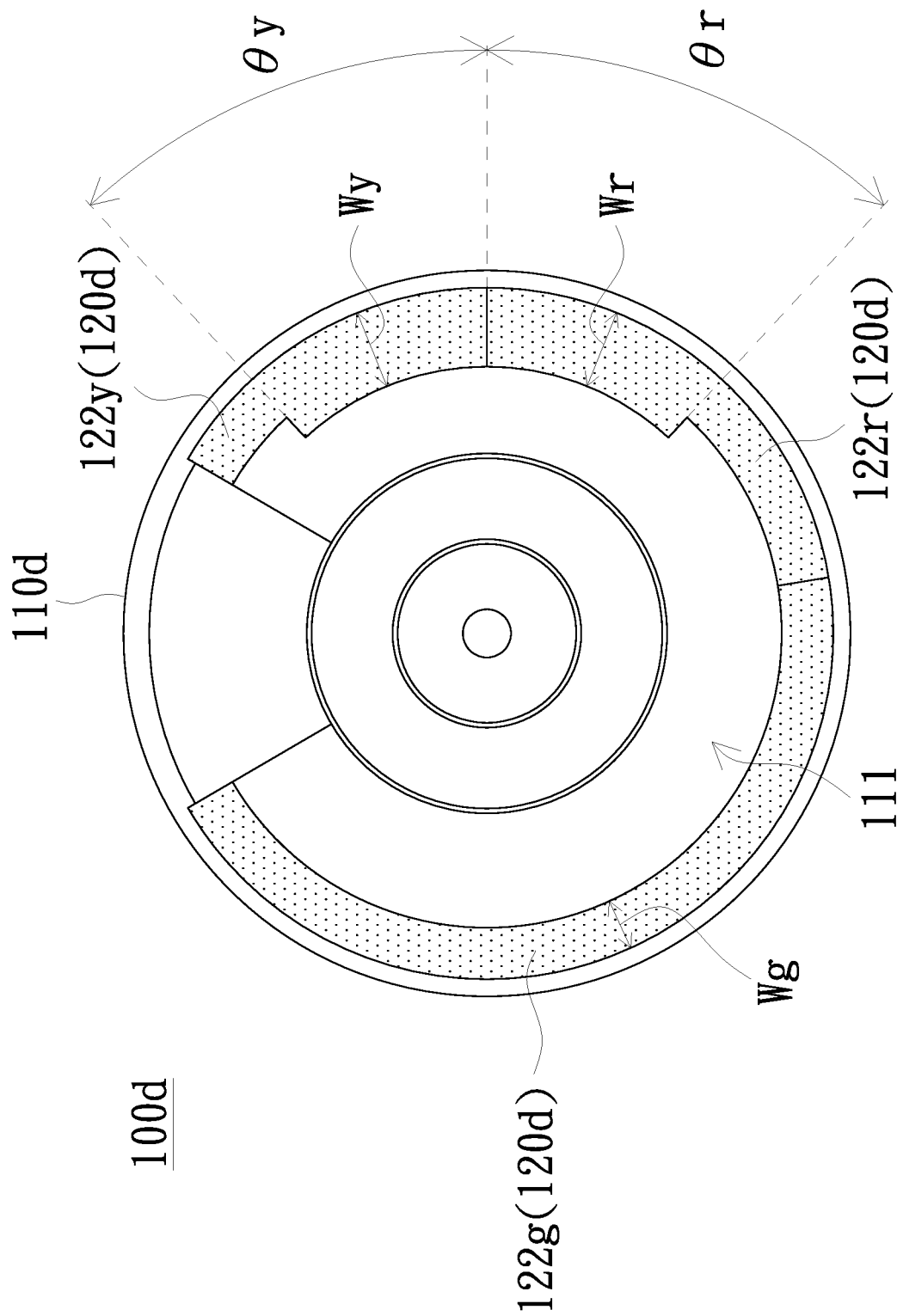
FIG. 4 is a schematic diagram of a wavelength conversion element in another embodiment of the invention.

FIG. 4 is a schematic diagram of a wavelength conversion element in another embodiment of the invention. The structure and the advantage of the wavelength conversion element 100d in this embodiment are similar to those of the aforementioned wavelength conversion element 100, and only the difference will be described in the following. In order to clearly describe the difference between this embodiment and the aforementioned embodiment, the wavelength conversion layer 120d of the wavelength conversion element 100d includes three wavelength conversion sections 122g, 122y and 122r with different light-emitting wavelengths, but the feature of the wavelength conversion element 100d is not limited by the quantity of the wavelength conversion layers. Please refer to FIG. 4, the wavelength conversion sections 122g, 122y and 122r may have identical or different thicknesses in a direction perpendicular to the bearing surface 111; alternatively, the wavelength conversion sections 122g, 122y and 122r may have identical or different densities in a direction perpendicular to the bearing surface 111.

In the following, table 1 and FIG. 4 illustrate four application examples P, A, B and C in which the wavelength conversion sections 122g, 122y and 122r having different specifications. In table 1, the thicknesses of the wavelength conversion sections 122g, 122y and 122r are respectively denoted as Tg, Ty and Tr, and the densities of the wavelength conversion sections 122g, 122y and 122r are respectively denoted as Dg, Dy and Dr. Furthermore, the wavelength conversion sections 122g, 122y and 122r in the application example P are not provided with the counterweight portion, and the wavelength conversion sections 122y and 122r in the application examples A, B and C are provided with the counterweight portion. In table 1 and FIG. 4, the area of the counterweight portion is expressed by the radial widths Wy and Wr and the angle ranges θy and θr. Please refer the description below for details.

TABLE 1

| application example | wavelength conversion section 122g | wavelength conversion section 122y | wavelength conversion section 122r | initial amount of unbalance (mg) |
|---|---|---|---|---|
| P | Dg = 3.8 g/cm³<br>Wg = 7 mm<br>Tg = 0.18 mm | Dy = 2.8 g/cm³<br>Wy = 7 mm<br>Ty = 0.18 mm | Dr = 2.8 g/cm³<br>Wr = 7 mm<br>Tr = 0.18 mm | 219 |
| A | Dg = 3.8 g/cm³<br>Wg = 7 mm<br>Tg = 0.18 mm | Dy = 2.8 g/cm³<br>Wy = 11.45 mm<br>θy = 45°<br>Ty = 0.18 mm | Dr = 2.8 g/cm³<br>Wr = 11.70 mm<br>θr = 45°<br>Tr = 0.18 mm | 0 |
| B | Dg = 3.8 g/cm³<br>Wg = 7 mm<br>Tg = 0.18 mm | Dy = 2.8 g/cm³<br>Wy = 10.2 mm<br>θy = 21.5°<br>Ty = 0.22 mm | Dr = 2.8 g/cm³<br>Wr = 9.6 mm<br>θr = 17°<br>Tr = 0.22 mm | 0 |
| C | Dg = 3.8 g/cm³<br>Wg = 7 mm<br>Tg = 0.18 mm | Dy = 2.8 g/cm³<br>Wy = 12 mm<br>θy = 30°<br>Ty = 0.18 mm | Dr = 2.8 g/cm³<br>Wr = 12 mm<br>θr = 30°<br>Tr = 0.18 mm | 49 |

It can be seen from Table 1 that the initial amount of unbalances in the application examples A, B and C are significantly reduced, compared with the application example P. Briefly, the density Dg of the wavelength conversion section 122g is different from the density Dy of the wavelength conversion section 122y and the density Dr of the wavelength conversion section 122r in the application examples A, B and C. Furthermore, the thickness Tg of the wavelength conversion section 122g is different from the thickness Ty of the wavelength conversion section 122y and the thickness Tr of the wavelength conversion section 122r in the application example B. It can be seen from above that the initial amount of unbalance of the wavelength conversion element 100d can be reduced by adjusting the density and/or thickness of each of the wavelength conversion sections 122g, 122y and 122r, so that the stability of the wavelength conversion element 100d rotated at high speed can be improved accordingly.

It should be noted that the aforementioned first positioning portion and the second positioning portion are omitted in FIG. 4. However, in the embodiment shown in FIG. 4, the bearing surface 111 of the substrate 110d may be provided with, for example, the first positioning portion 112 shown in FIG. 1 or the first positioning portion 112b shown in FIG. 2, and the wavelength conversion section 122g may also be provided with the second positioning portion 121 shown in FIG. 1 or the second positioning portion 121b shown in FIG. 2, so that the first positioning portion 112 or 112b and the second positioning portion 121 or 121b can be engaged with each other. On the other hand, since the wavelength conversion sections 122y and 122r have the positioning portions, the bearing surface 111 of the substrate 110d may be also provided with the first positioning portion 112c shown in FIG. 3, wherein the first positioning portion 112c can be engaged with the positioning portions of the wavelength conversion sections 122y and 122r.

Figure 5:
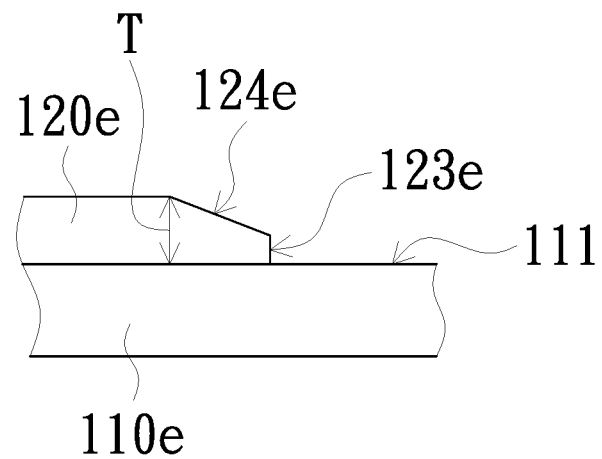
FIG. 5 is a schematic diagram of an outer edge of a wavelength conversion layer on a substrate in an embodiment of the invention.

FIG. 5 is a schematic diagram of an outer edge of a wavelength conversion layer on a substrate in an embodiment of the invention. In this embodiment, in the direction perpendicular to the bearing surface 111, the thickness T of the outer edge 123e of the wavelength conversion layer 120e along a radial direction R of the substrate 110e is decreased in a direction away from the center C of the substrate. The relative positions of the radial direction R, the center C and the outer edge 123e are the same as the relative positions of the radial direction R, the center C and the outer edge 123 shown in FIG. 1B. As shown in FIG. 5, the part of the wavelength conversion layer 120e adjacent to the outer edge 123e has an edge structure 124e, and the thickness T of the edge structure 124e is decreased in the direction toward to the outer edge 123e. The edge structure 124e is, for example, a curved structure or an inclined structure, but the invention is not limited thereto. In this embodiment, the air resistance caused by the wavelength conversion element 100e rotating at high speed can be efficiently reduced by the edge structure 124e. As a result, when the wavelength conversion element 100e is disposed on the wavelength conversion wheel, the vibration and the noise caused by the wavelength conversion wheel rotating at high speed can be efficiently reduced, thereby improving the stability of the wavelength conversion wheel rotating at high speed. It should be noted that the edge structure 124e shown in FIG. 5 may be applied to any one of the wavelength conversion elements 100, 100b, 100c and 100d in the aforementioned embodiments.

Figure 6:
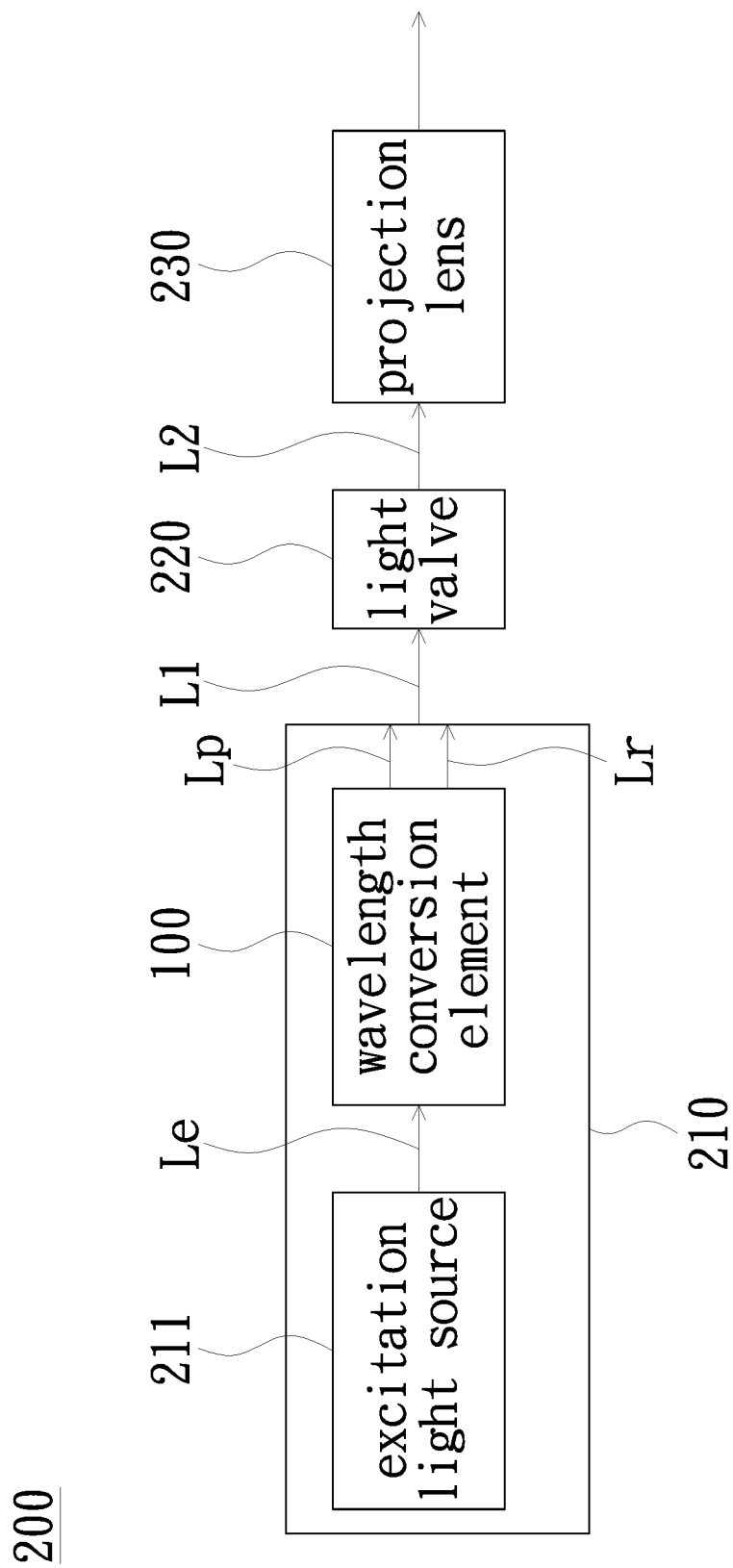
FIG. 6 is a schematic block diagram of a projection apparatus in an embodiment of the invention.

FIG. 6 is a schematic block diagram of a projection apparatus in an embodiment of the invention. Please refer to FIG. 6, a projection apparatus 200 includes an illumination system 210, a light valve 220 and a projection lens 230. The illumination system 210 is adapted to provide an illumination beam L1. The light valve 220 is disposed on a transmission path of the illumination beam L1 to convert the illumination beam L1 into an image beam L2. The projection lens 230 is disposed on a transmission path of the image beam L2 to project the image beam L2.

The illumination system 210 includes an excitation light source 211 and any one of the wavelength conversion elements 100, 100b, 100c, 100d and 100e in the aforementioned embodiments. The illumination system 210 shown in FIG. 6 is provided with the wavelength conversion element 100, but the invention is not limited thereto. Specifically, the excitation light source 211 can provide the excitation beam Le. The excitation light source 211 is, for example, a diode module of a light emitting diode (LED) or a laser diode (LD); alternatively, the excitation light source 211 may be a matrix constructed by the plurality of diode modules; but the invention is not limited thereto. The wavelength conversion element 100 is disposed on a transmission path of the excitation beam Le. In a time sequence, the excitation beam Le is converted into a converted beam Lp by the wavelength conversion layer 120 of the wavelength conversion element 100; and in another time sequence, the excitation beam Le passes through the optical zone 113 of the wavelength conversion element 100 (illustrated by the beam Lr shown in FIG. 6). Therefore, the illumination beam L1 is formed sequentially by the excitation beam Lr and the converted beam Lp. Since the features of the wavelength conversion element 100 have been described above, no redundant detail is to be given herein.

The light valve 220 is, for example, a digital micro mirror device (DMD), a liquid crystal on silicon (LCoS) or a liquid crystal display (LCD), but the invention is not limited thereto. Additionally, the quantity of the light valves is not limited in this embodiment. For example, the projection apparatus 200 in this embodiment may adopt a structure with single-panel LCD or three-panels LCD, but the invention is not limited thereto.

The projection lens 230 includes, for example, a combination of one or more optical lenses having diopter, such as any combinations of a biconcave lens, a biconvex lens, a meniscus lens, a convex-concave lens, a plano-convex lens and a plano-concave lens. On the other hand, the projection lens 230 may also include a flat optical lens. The kind or the type of the projection lens 230 is not limited in the invention.

Compared with the prior art, the projection apparatus 200 in this embodiment uses the wavelength conversion element 100, and therefore the projection apparatus 200 has the advantage of improved image quality.

In summary, since the wavelength conversion element of the invention uses the substrate having the first positioning portion and the wavelength conversion layer having the second positioning portion, the wavelength conversion layer has a clear positioning point on the substrate during the assembly process, so that the wavelength conversion layer can be accurately disposed at a preset position of the substrate. As a result, the wavelength conversion element of the invention can improve the light exciting efficiency. Moreover, since the projection apparatus of the invention uses the aforementioned wavelength conversion element, the projection apparatus has the advantage of improved image quality accordingly.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first positioning portion, the first positioning structure, the second positioning portion and the second positioning structure are only used for distinguishing various elements and do not limit the number of the elements.

What is claimed is:

1. A wavelength conversion element, comprising a substrate and a wavelength conversion layer, wherein:
    the substrate has a bearing surface and a first positioning portion, and the first positioning portion is located on the bearing surface; and
    the wavelength conversion layer is disposed on the bearing surface and has a second positioning portion corresponding to the first positioning portion, and the second positioning portion is adapted to engage with the first positioning portion;
    wherein the first positioning portion comprises a plurality of first positioning structures, the wavelength conversion layer has an inner edge close to a center of the substrate and an outer edge away from the center of the substrate in a radial direction of the substrate, the second positioning portion comprises a plurality of second positioning structures disposed at the inner edge and the outer edge, and the first positioning structures are adapted to engage with the second positioning structures.

2. The wavelength conversion element according to claim 1, wherein the second positioning structures are a plurality of protruded portions protruded from the inner edge and the outer edge, the first positioning structures are protruded from the bearing surface, and the first positioning structures and the protruded portions are respectively engaged with each other.

3. The wavelength conversion element according to claim 1, wherein the second positioning structures are a plurality of recessed portions recessed inward from the inner edge and the outer edge, the first positioning structures are protruded from the bearing surface, and the first positioning structures and the recessed portions are respectively engaged with each other.

4. The wavelength conversion element according to claim 1, wherein the wavelength conversion element comprises a plurality of the wavelength conversion layers, and the wavelength conversion layers have identical or different thicknesses in a direction perpendicular to the bearing surface.

5. The wavelength conversion element according to claim 1, wherein the wavelength conversion element comprises a plurality of the wavelength conversion layers, and the wavelength conversion layers have identical or different densities.

6. The wavelength conversion element according to claim 1, wherein the wavelength conversion layer has a plurality of radial widths.

7. The wavelength conversion element according to claim 1, wherein the wavelength conversion layer has an outer edge away from a center of the substrate in a radial direction of the substrate, and a thickness of the outer edge in a direction perpendicular to the bearing surface is decreased along the radial direction of the substrate in a direction away from the center of the substrate.

8. A wavelength conversion element, comprising a substrate and a wavelength conversion layer, wherein:
    the substrate has a bearing surface and a first positioning portion, and the first positioning portion is located on the bearing surface; and
    the wavelength conversion layer is disposed on the bearing surface and has a second positioning portion corresponding to the first positioning portion, and the second positioning portion is adapted to engage with the first positioning portion;
    wherein the first positioning portion comprises a first positioning structure, the wavelength conversion layer has an inner edge close to a center of the substrate and an outer edge away from the center of the substrate in a radial direction of the substrate, the second positioning portion is a counterweight portion extending from the inner edge of the substrate to the center of the substrate, the first positioning structure is protruded from the bearing surface, and the first positioning structure and the counterweight portion are respectively engaged with each other.

9. A projection apparatus, comprising an illumination system, a light valve and a projection lens, the illumination system being adapted to provide an illumination beam, the light valve being disposed on a transmission path of the illumination beam to convert the illumination beam into an image beam, the projection lens being disposed on a transmission path of the image beam to project the image beam, and the illumination system comprising an excitation light source and a wavelength conversion element, wherein:
    the excitation light source is adapted to provide an excitation beam; and
    the wavelength conversion element is disposed on a transmission path of the excitation beam, the wavelength conversion element comprises a substrate and a wavelength conversion layer, the substrate has a bearing surface and a first positioning portion, the first positioning portion is located on the bearing surface, the wavelength conversion layer is disposed on the bearing surface and has a second positioning portion corresponding to the first positioning portion, and the second positioning portion is adapted to engage with the first positioning portion;
    wherein the first positioning portion comprises a plurality of first positioning structures, the wavelength conversion layer has an inner edge close to a center of the substrate and an outer edge away from the center of the substrate in a radial direction of the substrate, the second positioning portion comprises a plurality of second positioning structures disposed at the inner edge and the outer edge, and the first positioning structures are adapted to engage with the second positioning structures.

10. The projection apparatus according to claim 9, wherein the second positioning structures are a plurality of the protruded portions protruded from the inner edge and the outer edge, the first positioning structures are protruded from the bearing surface, and the first positioning structures and the protruded portions are respectively engaged with each other.

11. The projection apparatus according to claim 9, wherein the second positioning structures are a plurality of recessed portions recessed inward from the inner edge and the outer edge, the first positioning structures are protruded from the bearing surface, and the first positioning structures and the recessed portions are respectively engaged with each other.

12. The projection apparatus according to claim 9, wherein the wavelength conversion element comprises a plurality of the wavelength conversion layers, and the wavelength conversion layers have identical or different thicknesses in a direction perpendicular to the bearing surface.

13. The projection apparatus according to claim 9, wherein the wavelength conversion element comprises a plurality of the wavelength conversion layers, and the wavelength conversion layers have identical or different densities.

14. The projection apparatus according to claim 9, wherein the wavelength conversion layer has a plurality of radial widths.

15. The projection apparatus according to claim 9, wherein the wavelength conversion layer has an outer edge away from a center of the substrate in a radial direction of the substrate, and a thickness of the outer edge in a direction perpendicular to the bearing surface is decreased along the radial direction of the substrate in a direction away from the center of the substrate.

16. A projection apparatus, comprising an illumination system, a light valve and a projection lens, the illumination system being adapted to provide an illumination beam, the light valve being disposed on a transmission path of the illumination beam to convert the illumination beam into an image beam, the projection lens being disposed on a transmission path of the image beam to project the image beam, and the illumination system comprising an excitation light source and a wavelength conversion element, wherein:

the excitation light source is adapted to provide an excitation beam; and the wavelength conversion element is disposed on a transmission path of the excitation beam, the wavelength conversion element comprises a substrate and a wavelength conversion layer, the substrate has a bearing surface and a first positioning portion, the first positioning portion is located on the bearing surface, the wavelength conversion layer is disposed on the bearing surface and has a second positioning portion corresponding to the first positioning portion, and the second positioning portion is adapted to engage with the first positioning portion;

wherein the first positioning portion comprises a first positioning structure, the wavelength conversion layer has an inner edge close to a center of the substrate and an outer edge away from the center of the substrate in a radial direction of the substrate, the second positioning portion is a counterweight portion extending from the inner edge to the center of the substrate, the first positioning structure is protruded from the bearing surface, and the first positioning structure and the counterweight portion are respectively engaged with each other.

* * * * *